United States Patent

Baetschmann et al.

[11] Patent Number: 4,807,587
[45] Date of Patent: Feb. 28, 1989

[54] PROCESS OF FORMING OPENINGS

[75] Inventors: Daniel Baetschmann, Alpnach-Dorf, Switzerland; Hansjorg Nipp, Mauren, Liechtenstein; Karl Blaas, Buchs, Switzerland

[73] Assignee: Hilti Aktiengesellschaft

[21] Appl. No.: 98,779

[22] Filed: Sep. 17, 1987

Related U.S. Application Data

[63] Continuation-in-part of Ser. No. 802,756, Nov. 27, 1985, abandoned.

[30] Foreign Application Priority Data

Nov. 29, 1984 [DE] Fed. Rep. of Germany ........ 3443590

[51] Int. Cl.[4] .......................... B28D 1/00; B23B 35/00
[52] U.S. Cl. ......................................... 125/1; 408/1 R; 408/7; 408/12; 408/15; 29/407; 29/593; 175/50
[58] Field of Search ........................ 125/1; 408/1, 6, 7, 408/9, 12, 14, 710, 15; 29/407, 593; 175/50; 324/323, 61 P

[56] References Cited

U.S. PATENT DOCUMENTS

| | | | |
|---|---|---|---|
| 2,409,397 | 10/1946 | Sheehan | 408/710 |
| 2,747,154 | 5/1956 | Abrams | 29/407 |
| 4,219,776 | 8/1980 | Arulanandan | 324/61 P |

FOREIGN PATENT DOCUMENTS 3206354 2/1982 Fed. Rep. of Germany ........ 408/12

*Primary Examiner*—Frederick R. Schmidt
*Assistant Examiner*—Maurina Rachuba
*Attorney, Agent, or Firm*—Toren, McGeady & Associates

[57] ABSTRACT

In a process using a hand-held drilling device for forming openings in a construction material containing steel reinforcing members, during the drilling step the electrical resistance between the drill bit and the reinforcing members is continuously measured. If the drill bit contacts the reinforcing member the measuring circuit is shorted out and the electrical resistance drops. The drop in resistance can be used as a signal for cutting power to the drilling device or for declutching or braking the device.

2 Claims, 1 Drawing Sheet

PROCESS OF FORMING OPENINGS

This is a continuation-in-part of application Ser. No. 802,756, filed Nov. 27, 1985.

BACKGROUND OF THE INVENTION

The present invention is directed to a process of forming openings in construction material, such as concrete, rock or the like, containing steel reinforcing members and using hand-held drilling devices with drilling, milling or chisel bits for forming the opening.

To form openings, such as bores, grooves or the like, at the present time, apart from so-called wall milling devices, principally drilling devices or chipping hammers are used. Such devices operate on an electropneumatic system with a considerably higher material removal performance as compared to impact or percussion drilling devices which have been used in the past.

A problem which has existed in the past is that during the drilling operation the drill bit might contact a steel reinforcing member, since the member is not visible from the exterior of the material being drilled. If such contact occurs, the bit is very rapidly damaged in view of the impact energy when the bit contacts the reinforcing member and after a short time the bit becomes unusable.

Metal detectors are known for locating steel reinforcing members within the construction material. Such devices, however, are very inaccurate and from a practical point of view are suitable only for the detection of reinforcing members located directly below the surface of the construction material. In addition, such detectors are very delicate and are not suitable for the rough handling experienced at construction sites.

There are other expensive means for determining the location of the reinforcing members, such as X-ray technology and ultrasonic procedures or the like, however, they are not utilized because of practical and economic considerations.

SUMMARY OF THE INVENTION

Therefore, the primary object of the present invention is to provide an economical and functionally efficient process for forming openings in construction material containing steel reinforcing members.

In accordance with the present invention, the electrical resistance of the construction material between the drill bit and the steel reinforcing member is measured and the resistance drops when the bit approaches a reinforcing member and such drop can be used as a signal for controlling the operation of the hand-held drilling device.

As compared to the methods used in the past, in the present invention the steel reinforcing members are not located before the commencement of the drilling procedure, rather the location of the reinforcing members is determined as the drill bit approaches a reinforcing member. Since the approach before initial contact of the bit with the reinforcing member triggers an appropriate signal, subsequent damage can be prevented by providing an immediate reaction to the signal. The present invention is based, for instance, on a true resistance measurement. Moreover, it is also possible to measure the capacitive or conductive resistance or the impedance by using alternating current. Such a resistance measurement can be made with a low voltage and harmless weak current. Concrete which has set is more or less electrically conductive in accordance with its moisture content. Compared to metals, however, the resistance of concrete is considerably greater. If the drill bit strikes against a steel reinforcing member so that the two metals contact one another, the measuring circuit is shorted out and this can be noted by the sudden resistance drop. The signals generated by the resistance drop during approach can be used to control the operation of the drilling device, such as for cutting off the power supply, or the actuation of a clutch, brake or the like. The resistance drop during approach and the short circuiting of the electric circuit can, for instance, be indicated by a measuring device, a signal lamp or a sound signal. When the signal occurs, it can serve as an indication to the operator to initiate a specific procedure.

In the drilling tools of the type under discussion there are two protective classes. In drilling devices according to protective class I, also designated as protective grounding, the electrically conducting parts, such as the housing, spindles, gear box units and the like are mutually interconnected and are connected to ground. The grounding can be effected by ground conductors in the electrical power supply line. Stationary machines can be grounded directly, such as to a metal water pipe.

In protective class II, designated as protective insulation, at least the motor or the entire housing is enclosed in an insulation sheath. If the drilling device includes a gear box unit, then the mechanical connection between the motor and the gear box must be designed to be insulated electrically.

For the measurement of electrical resistance of the construction material, many different arrangements are possible depending on the type of structure involved. A dependable and in most instances effective solution involves the measurement of the resistance by a direct electrical connection with the steel reinforcing members.

Such an electrical connection of the drilling device through a measuring circuit to the steel reinforcing members can be effected by means of a reinforcing member protruding from the structure. Another possibility involves forming a bore at one point in the structure where there is great probability that a reinforcing member is located. In such a situation, the electrical connection with the reinforcing members can be achieved by inserting a metallic dowel into the structure into contact with the reinforcing member. The metallic dowel acts as an electrode and provides contact with the reinforcing member. Such an arrangement would function, only in the case that the group of reinforcing members in the structure are mutually interconnected so as to be electrically conductive. In such a measuring arrangement, devices of the protective classes I and II can be utilized and a flexible cable is used in addition to the power cable to which the electric current is supplied.

The code requirement for steel reinforcing members differ considerably between countries depending on the type of structure involved. For instance, in certain countries the reinforcing members used in public buildings must, for reasons of accident prevention, be provided with lightning and corrosion protection, they must be mutually connected together so as to be electrically conducting and, in addition, must be grounded. In such a situation, it is advantageous if the resistance measurement is effected through the grounding of the reinforcing members. Under such conditions the time consuming search for a reinforcing member for providing an electrical contact is avoided, so that such a system can function, it is merely necessary to ground the measurement circuit. Since such grounding is not required to satisfy the very high requirements of a protective grounding, it can be achieved in a relatively simple manner by contact with a metallic water pipe or by an electrode inserted into the earth. This system is suitable for devices of the protective classes I or II.

If the reinforcing members are interconnected so as to be electrically conducting and grounded, and if the power supply includes a grounded protective conductor, then, if a device according to protective class I is used, the measurements of the resistance can take place over the protective conductor of the device and the ground conductor system which is a part of the power supply and which is connected with the reinforcing member. The measuring circuit established upon contact of the bit with a reinforcing member, utilizes the grounding of the bit and the grounding of the reinforcing member. The reliability of the measurement depends largely on the foundation at the site. Accordingly, such systems function particularly reliably in ground water areas, while the grounding resistance in areas, such as dry sand, is notably high. The system, however, is particularly simple, since it does not require any additional installations apart from the required electric current supply.

The operational capacity of the measuring system can be checked in a very simple manner in all three procedures by bringing the ground conductor or the additional electrical connection into contact with the bit so that the measuring circuit is shorted out. To simplify the check, the bit can be provided with a test key which establishes the circuit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
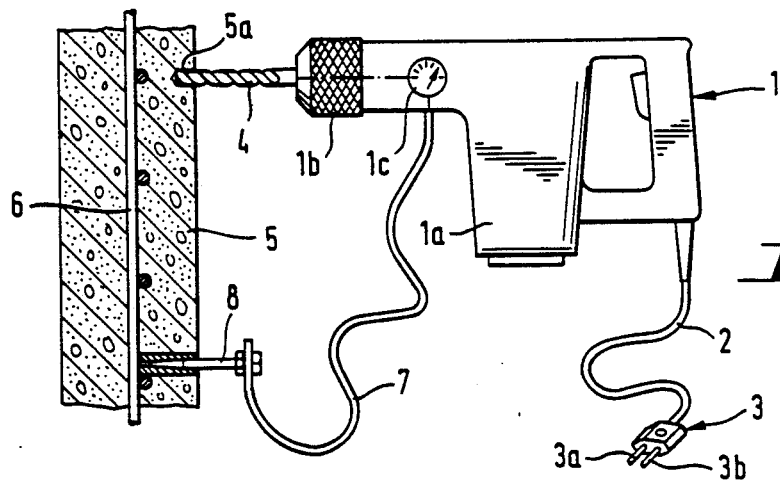
FIG. 1 is an elevational view illustrating a drilling device of the protective class II while drilling a hole into a structure containing steel reinforcing members, with a direct electrical connection to the reinforcing members.

In FIG. 1 a drilling device 1 is illustrated made up of a housing 1a and a tool holder or chuck 1b mounted at the front end of the housing. A flexible power cable 2 provides the connection between the drilling device and the power or current supply line. A plug 3 is located at the free end of the power cable. Plug 3 has a phase pin 3a and a neutral conductor pin 3b. The drilling device is constructed according to protective class II. A device constructed in accordance with protective class I can be used in a similar manner. The arrangement of the plug 3 differs in accordance with the regulations of individual countries and is shown only by way of example. A drill bit 4 is inserted into the chuck 1b of the drilling device. As shown, the bit is being drilled into a construction material 5 containing steel reinforcing members 6 with the bit forming an opening or bore 5a. The steel reinforcing members 6 are electrically conductively interconnected. A measuring device 1c is located on the housing 1a of the drilling device 1. This measuring device 1c is connected in an electrically conductive manner with the steel reinforcing members through a flexible line 7 and a metallic expansion dowel 8 and continuously measures the electrical resistance of the construction material between the bit 4 and the steel reinforcing members 6. If the bit 4, while drilling into the construction material, approaches and then contacts one of the reinforcing members 6 then the reistance drops practically to zero. Such a drop during approach can be visually checked on the measuring device. It is also possible, however, to use the resistance drop to provide a visual signal, such as by a lamp, or a clearly audible sound signal. Moreover, it is possible to use the signal to switch off or cut off the power supply or to disengage a clutch or actuate a brake.

Figure 2:
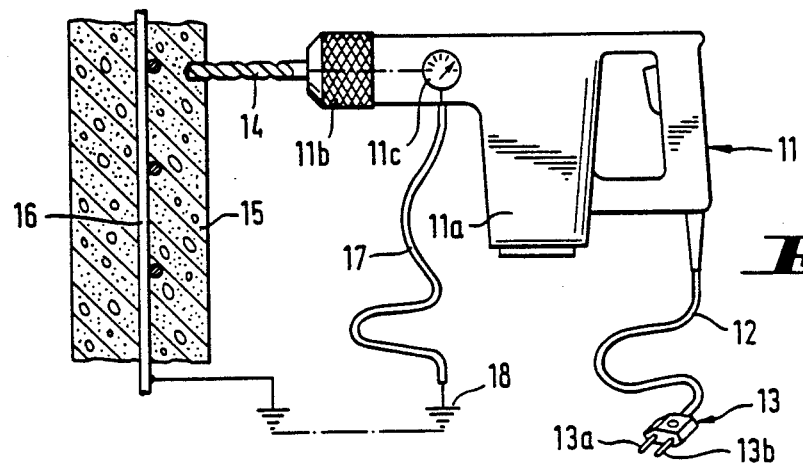
FIG. 2 is a view similar to FIG. 1 of a device of protective class II during drilling an opening into a structure containing steel reinforcing members, with grounded connecting lines.

In FIG. 2 a drilling device 11 is shown corresponding basically to the one displayed in FIG. 1. This drilling device can be constructed in accordance with protective class I or II. Drilling tool 11 includes a housing 11a and a chuck 11b connected to the front end of the housing. In addition, a power cable 12 extends from the housing for connecting the device to a power supply line. A plug 13 is located at the free end of the power cable 12 spaced outwardly from the housing and the plug has two contact pins 13a, 13b which can be selectively connected with the phase or the zero conductor of the power supply line. A bit 14 is inserted in the chuck 11b and is shown starting to drill an opening or hole into a construction material 15 containing steel reinforcing members 16. The difference from the embodiment shown in FIG. 1 is that the reinforcing members 16 are grounded. The measuring circuit is closed when the drill bit 14 contacts a steel reinforcing member 16 with an additional flexible connecting line 17 connected to the ground 18. In this embodiment, the connection of the measuring device 11c located on the housing 11a with the steel reinforcing members 16 does not take place directly but rather over the ground 18 to which the line 17 is connected. The possibilities mentioned above about the utilization of the signal occurring at the resistance drop can also be used in this embodiment. The measuring device 11c or a corresponding circuit device can be located at a random point in the connecting line 17.

Figure 3:
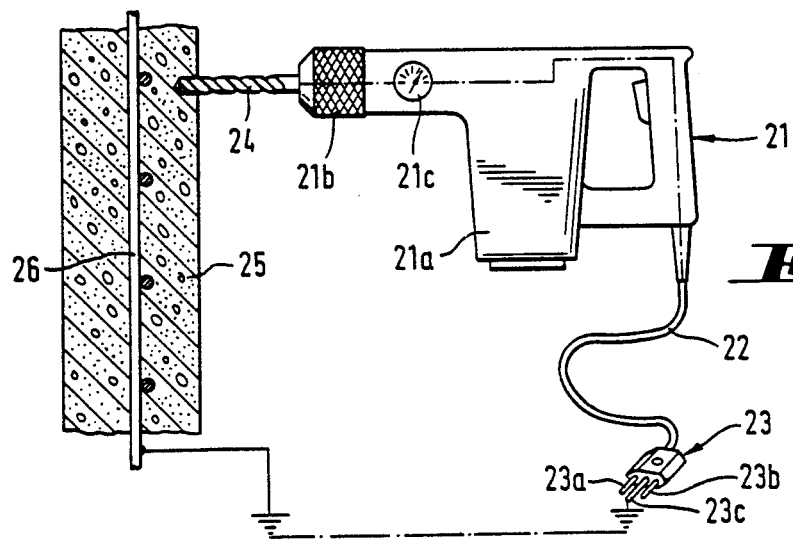
FIG. 3 is a view similar to FIGS. 1 and 2 of a drilling tool of protective class I with a ground conductor located in the power supply cable with the drilling device cutting a hole or bore into a structure containing steel reinforcing members.

A third embodiment is shown in FIG. 3 including a drilling device 21 constructed in accordance with protective class I. Drilling tool 21 includes a housing 21a with a chuck 21b connected to the front end of the housing. The drilling device 21 is connected with the power supply line by a power cable 22. A plug 23 is located at the free end of the cable 22 spaced outwardly from the housing, however, as distinguished from the embodiment shown in FIGS. 1 and 2, the plug has three contact pins 23a, 23b, 23c. Contact pins 23a, 23b are connected with the phase or zero conductor of the power supply line. The contact pin 23c serves as a protective conductor and is connected with a ground connection of the power supply line. Drill bit 24 is inserted into the chuck 21b and is shown starting to drill a hole into a construction material 25 containing steel reinforcing members 26. The reinforcing members 26 are grounded. The connection of the measuring circuit occurs through the protective conductor of the device and the grounding of the power supply line as well as of the steel reinforcing members 26. A separate connecting conductor is not required.

While specific embodiments of the invention have been shown and described in detail to illustrate the application of the inventive principles, it will be understood that the invention may be embodied otherwise without departing from such principles.

We claim:

1. Process of forming an opening using a hand-held drilling device including a drilling or chisel bit in a masonry construction material having an outside surface, with the construction material containing steel reinforcing members spaced inwardly from the outside and being electrically conductively interconnected, comprising the steps of drilling into the construction material from the outside surface, providing a signal when the bit in the drilling device contacts a reinforcing member, wherein the improvement comprises measuring the electrical resistance of the construction material between the bit and the reinforcing member during the drilling step through a direct electrical connection with the reinforcing members, and providing the signal when the electrical resistance drops as the bit one of approaches or contacts the reinforcing member, and using the signal for controlling the operation of the drilling device.

2. Process of forming an opening using a hand-held drilling device including a drilling or chisel bit in a masonry construction material having an outside surface, with the construction material containing steel reinforcing members spaced inwardly from the outside surface and being electrically conductively interconnected, comprising the steps of drilling into the construction material from the outside surface, providing a signal when the bit in the drilling device contacts a reinforcing member, wherein the improvement comprises measuring the electrical resistance of the construction material between the bit and the reinforcing member during the drilling step through a direct electrical connection with the reinforcing members, and providing the signal when the electrical resistance drops as the bit approaches the reinforcing member, and using the signal for controlling the operation of the drilling device.

* * * * *